United States Patent
Gutwein et al.

(10) Patent No.: US 6,245,371 B1
(45) Date of Patent: Jun. 12, 2001

(54) METHOD AND APPARATUS FOR BREWING A FLUID EXTRACT USING AN INCLINED FILTER POUCH CONTAINING FLAVOR EXTRACTABLE PARTICLES

(75) Inventors: Roger William Gutwein; Amy Suzanne Dawson; Charles Thomas Howell, all of Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/260,280

(22) Filed: Mar. 2, 1999

(51) Int. Cl.[7] .............................. A23F 5/24; A23F 5/26; A23F 3/16; A23F 3/18
(52) U.S. Cl. .......................... 426/433; 426/77; 426/430; 426/435; 426/436
(58) Field of Search ................................ 426/430, 433, 426/435, 436, 77

(56) References Cited

U.S. PATENT DOCUMENTS

| | | | |
|---|---|---|---|
| 2,027,272 | 1/1936 | Flood | 210/162 |
| 2,728,670 | 12/1955 | Young et al. | 99/77.1 |
| 2,907,052 | 10/1959 | Louis et al. | 4/187 |
| 3,171,624 | 3/1965 | Hughes | 248/94 |
| 3,309,980 | 3/1967 | Bozek | 99/295 |
| 3,320,073 | 5/1967 | Bixby, Jr. et al. | 99/71 |
| 3,590,723 | 7/1971 | Dokos et al. | 99/289 |
| 3,610,132 | 10/1971 | Martin et al. | 99/295 |
| 3,694,235 | 9/1972 | Siegel | 99/171 B |
| 3,861,285 | 1/1975 | Martin | 99/295 |
| 3,971,305 | 7/1976 | Daswick | 99/295 |
| 3,983,797 | 10/1976 | Wurm | 99/306 |
| 4,224,168 | 9/1980 | Tragardh | 210/470 |
| 4,519,911 * | 5/1985 | Shimizu . | |
| 4,843,955 | 7/1989 | Henn et al. | 99/295 |
| 4,983,410 | 1/1991 | Dinos | 426/77 |
| 4,995,978 | 2/1991 | Van de Gang | 210/474 |
| 5,012,629 | 5/1991 | Rehman et al. | 53/453 |
| 5,190,652 | 3/1993 | van Thoor et al. | 210/474 |
| 5,298,267 | 3/1994 | Gruenbacher | 426/77 |
| 5,906,844 * | 5/1999 | Stahli et al. . | |

FOREIGN PATENT DOCUMENTS

| | | |
|---|---|---|
| 0 190 912 | 2/1986 | (EP) . |
| 374729 | 6/1932 | (GB) . |
| 1427375 | 10/1973 | (GB) . |
| 2183459 | 11/1985 | (GB) . |
| 2215189 | 9/1989 | (GB) . |

* cited by examiner

Primary Examiner—Anthony J. Weier
(74) Attorney, Agent, or Firm—Peter D. Meyer

(57) ABSTRACT

A method of brewing a fluid extract using a filter pouch containing flavor extractable particles. One step is supporting a fully compliant, fluid-permeable filter pouch partially filled with flavor extractable particles such that the pouch is inclined at an angle to horizontal ranging from about 30° to about 90° so that the particles accumulate at a bottom end of the filter pouch. Another step is directing brew water to near an upper end of the filter pouch above the particles. The brew water enters the filter pouch without the need for an opening in the pouch, and drops to infiltrate the particles. The particles are partially fluidized by and suspended in the brew water and they rise with the brew water into an empty portion of the filter pouch without a need for opposing sides of the filter pouch to separate to generate internal space. A further step includes brewing a fluid extract from the particles in the filter pouch and discharging the fluid extract from the filter pouch. The filter pouch has sufficient exit area that a fluid extract discharge rate matches a rate of brew water entry into the filter pouch when a fluid head is produced inside the filter pouch which is at least as great as a vertical depth of particles in the filter pouch.

4 Claims, 4 Drawing Sheets

METHOD AND APPARATUS FOR BREWING A FLUID EXTRACT USING AN INCLINED FILTER POUCH CONTAINING FLAVOR EXTRACTABLE PARTICLES

FIELD OF THE INVENTION

The present invention relates to brewing beverages and more particularly to a method of and apparatus for brewing beverages in filter pouches. Even more particularly, the present invention relates to a method and apparatus for reducing brew water bypass of filter pouches and improving consistency of brewing within filter pouches.

BACKGROUND OF THE INVENTION

Brewing coffee typically results in the extraction of 15% to 30% yield of dissolved solids from coffee particles, which are mixed with hot brew water for several minutes. A resulting fluid extract is gravity filtered from spent coffee grounds by a piece of filter paper. Commercial brewing machines provide about half a gallon of hot water, typically at about 195° F. to a spray nozzle above a brew basket. In the brew basket is placed an open cup-shaped filter onto which is placed a quantity of flavor extractable coffee particles. When brew water is sprayed onto the loosely packed particles, the particles tend to float and many become suspended or fluidized in the brew water. This is believed to represent the ideal condition for brewing the maximum dissolved solids from the particles. Brew water is typically sprayed for about 3 minutes onto the particles where it continuously flushes extracted material from the particles as the fluid extract passes through the filter. The brew basket preferably has a discharge opening under the filter sufficient to drain all fluid extract from the filter in about 3 to 4 minutes.

A problem with the standard loose particle brewing system is that particle spillage and contamination are present at different points in the process. For example, particles may be spilled when manually dumping them into the cup-shaped filter. Also, particles may bypass the filter if brew water overflows the filter or the filter is otherwise placed improperly in the brew basket. Furthermore, each batch of spent grounds has to be removed and is often spilled when the wet filter is pulled from the brew basket for disposal. To solve the particle containment problem, the commercial brewing industry has adopted filter pouches of various designs, wherein a pre-measured quantity of loosely packed particles is totally enclosed within each pouch. The user therefore never handles particles directly.

Although filter pouches may solve one problem, they often cause other problems. For example, even though particles may be loosely packed within a filter pouch, insufficient space for particles to expand and become fluidized can result in the agglomeration of some particles. The agglomerated condition is much less conducive to extraction than is particle suspension. Lower percentages of dissolved solids are extracted when pouches have insufficient internal space. Prior art discloses pouches of complex and expensive construction which provide for pouch expansion in order to provide the required internal space.

Another pouch problem is that filter material located between the brew water spray and the pouch-contained particles may interfere with the fluidizing of particles. The brew water must first enter the pouch before particles may be fluidized for brewing. Although brew water easily passes through filter material, overall open area is often insufficient to allow the full flow of brew water into the pouch. If the pouch is not able to adopt a cup-shape to form a reservoir, some brew water may bypass the filter pouch, ultimately diluting the fluid extract from the pouch. Other pouch and brew basket designs intend for the pouch to form a fluid seal with the basket so that external bypass cannot occur. Such sealing is inconsistent, however. Furthermore, when a filter pouch is partially filled with particles in order to permit particle expansion, manual handling of the pouch may result in most of the particles accumulating at one end of the pouch. If this is not corrected when the pouch is manually laid horizontally in the brew basket, a portion of the pouch will likely be empty. Brew water easily finds such empty portions and flows directly through the pouch without contacting particles. This too is an undesirable form of brew water bypass.

What is needed is a filter pouch brewing system which reduces undesirable brew water bypass and yet provides sufficient space for particles to become suspended in brew water inside the pouch for consistently optimum brewing.

SUMMARY OF THE INVENTION

In practicing the present invention the problems of particle containment, brew water bypass, and providing space within the pouch for particles to expand without agglomerating are solved, so that consistent and optimum brewing is possible with each replacement filter pouch used in a brewing system.

In one preferred embodiment of the present invention, a method of brewing a fluid extract uses a filter pouch containing flavor extractable particles. The method includes a step of supporting a fully compliant, fluid-permeable filter pouch partially filled with flavor extractable particles such that the pouch is inclined at an angle to horizontal ranging from about 30° to about 90° so that the particles accumulate at a bottom end of the filter pouch. Another step is directing brew water to near an upper end of the filter pouch above the particles. The brew water enters the filter pouch without the need for an opening in the filter pouch. The brew water drops to infiltrate the particles.

The particles are partially fluidized by and suspended in the brew water and they rise with the brew water into an empty portion of the filter pouch without a need for opposing sides of the filter pouch to separate to generate internal space. A further step includes brewing a fluid extract from the particles in the filter pouch and discharging the fluid extract from the filter pouch. The filter pouch has sufficient exit area that a fluid extract discharge rate matches a rate of brew water entry into the filter pouch when a fluid head is produced inside the filter pouch which is at least as great as a vertical depth of particles in the filter pouch.

The filter pouch is preferably supported in a brew basket by a fluid-permeable support member. The method further comprises the step of draining the fluid extract from the brew basket at a rate sufficient to prevent a pool of fluid extract contacting the bottom end of the filter pouch so that the fluid extract discharge rate remains substantially undisturbed.

The step of directing brew water to near an upper end of the filter pouch is preferably accomplished by using a brew water conduit in contact with an outer surface of the filter pouch to reduce surface tension thereat as brew water flows over or through the conduit, such that the brew water enters the filter pouch with minimal resistance, thereby reducing brew water running off the outer surface of the filter pouch. The brew water conduit is preferably a plurality of flexible fingers in fluid communication with a brew water reservoir having drain holes. The flexible fingers contact the outer surface of the filter pouch as brew water flows over the fingers from the drain holes.

In another preferred embodiment of the present invention, a replaceable filter pouch and reusable brew basket apparatus for a brewing system includes a fully compliant, fluid-permeable filter pouch. The filter pouch is partially filled with flavor extractable particles. Also included is a brew basket having a fluid-permeable support member therein. The support member supporting the filter pouch is at an angle to horizontal ranging from about 30° to about 60°. The support member locates a bottom end of the filter pouch sufficiently above a bottom surface of the brew basket to avoid contact with a fluid extract pool at the bottom of the brew basket during brewing. Further included is a means for directing hot brew water from a reservoir to near an upper end of the filter pouch for entry into the filter pouch above a level of particles therein, so that brew water infiltrates the particles to brew a fluid extract therefrom. The fluid extract drains from the filter pouch into the bottom of the brew basket having an orifice therein such that the fluid extract discharges to a removable container therebelow.

The reservoir is preferably connected to the brew basket for receiving brew water from a spray head of a brewing machine. The reservoir has a plurality of drain holes at a bottom end of the reservoir. The drain holes are located adjacent to flexible fingers extending from the bottom end and contacting an outer surface of the filter pouch to reduce surface tension at the outer surface. The brew water, flowing from the reservoir through the drain holes and over the flexible fingers to the outer surface of the filter pouch, flows primarily into the filter pouch instead of running off the outer surface.

The filter pouch when inclined has the particles accumulate at a bottom end of the filter pouch such that the brew water entering the filter pouch drops onto and infiltrates the particles. The particles are partially fluidized by and suspended in the brew water and they rise with the brew water into an empty portion of the filter pouch preferably without a need for opposing sides of the filter pouch to separate to generate internal space.

Preferably, the filter pouch when inclined provides sufficient exit area that a fluid extract discharge rate matches a rate of brew water entry into the filter pouch when a fluid head is produced inside the filter pouch which is at least as great as a vertical depth of particles in the filter pouch.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
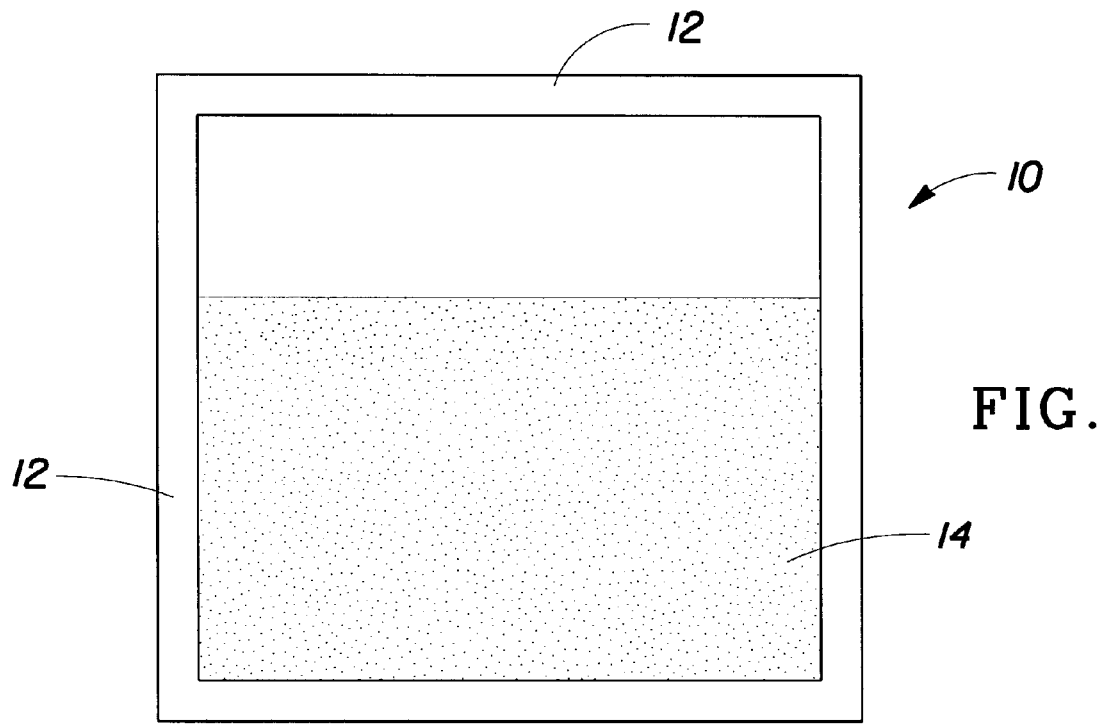
FIG. 1 is a front elevation view of a preferred embodiment of the filter pouch of the present invention, disclosing a partially filled rectangular pouch sealed around its perimeter by a fin seal.
Figure 2:
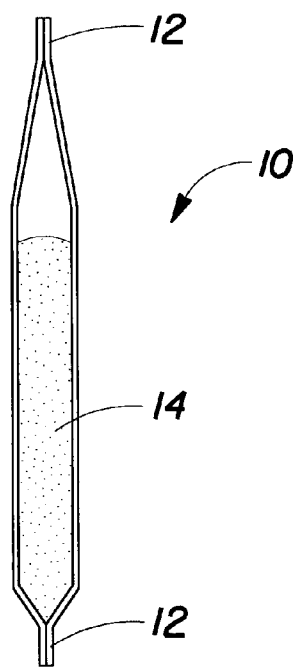
FIG. 2 is a side elevation view thereof, showing a substantially flat pouch.

Referring now to the drawings, and more particularly to FIGS. 1 and 2, there is shown a first preferred embodiment of the filter pouch of the present invention, generally indicated as 10. Filter pouch 10 is preferably rectangular in shape and has fin seals 12 around its perimeter. Filter pouch 10 is preferably made uniformly front and back of porous heat-sealable filter paper, such as #3968, a fluid permeable filter paper available from Dexter Corporation of Windsor Locks, Connecticut. Filter pouch 10 is preferably made at low cost by high speed machinery, such as by form-n-fill-seal machines. The manufacture of pouch 10 is well known in the art. Two parallel continuous webs or one web folded of filter material are fed together at a point where fin seals are made via heat and pressure bonding to form an open ended pouch into which flowable material may be inserted. Following insertion of flowable material, a second fin seal is made to totally close filter pouch 10. Individual filter pouches are then cut from the continuous webs or folded web.

Figure 5:
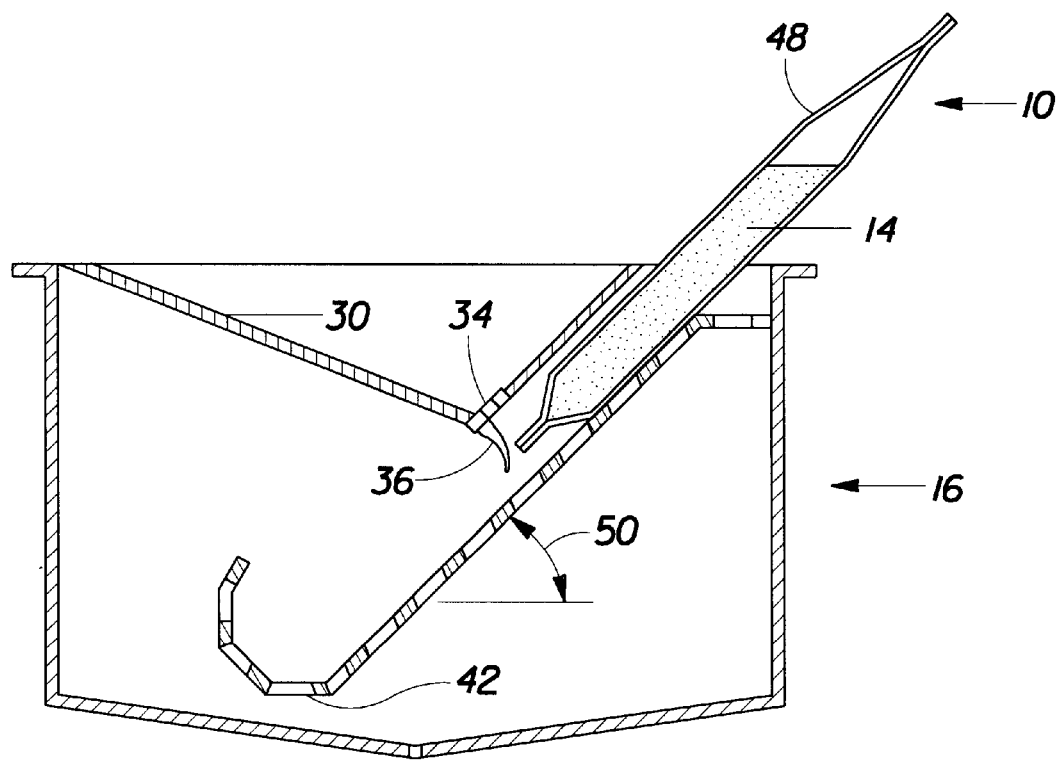
FIG. 5 is a front elevation cross-section view similar to FIG. 4, showing the preferred filter pouch of the present invention being placed onto the support member of the brew basket of the present invention.

As shown in FIGS. 1 and 2, filter pouch 10 contains flavor extractable particles 14, which are preferably particles of coffee, tea, herbs, spices, natural flavorings, or roasted grains. Particles 14 preferably occupy from about 30% to about 60% of the available volume of filter pouch 10 so that a brewing fluid can be added to filter pouch 10 above a level of particles in filter pouch 10 and particles 14 may be fluidized and expand within filter pouch 10 instead of being agglomerated. Filter pouch 10, when filled with particles 14, remains substantially flat, as shown in FIGS. 2 and 5. Preferably, particles 14 are of a size and filter pouch 10 has a porosity such that particles 14 may not escape from filter pouch 10. An example of particles 14 is FOLGERS® coffee, made by The Procter & Gamble Company of Cincinnati, Ohio. Such coffee particles are characterized as green coffee beans that have been roasted and ground to an average particle size of about 750 microns.

Filter pouch 10 may be non-rectangular, made of differing materials front and back, have other than fin seals, and be filled with a material form other than particles, such as flakes, as long as the brewing processes described herein are possible with such variations.

Figure 3:
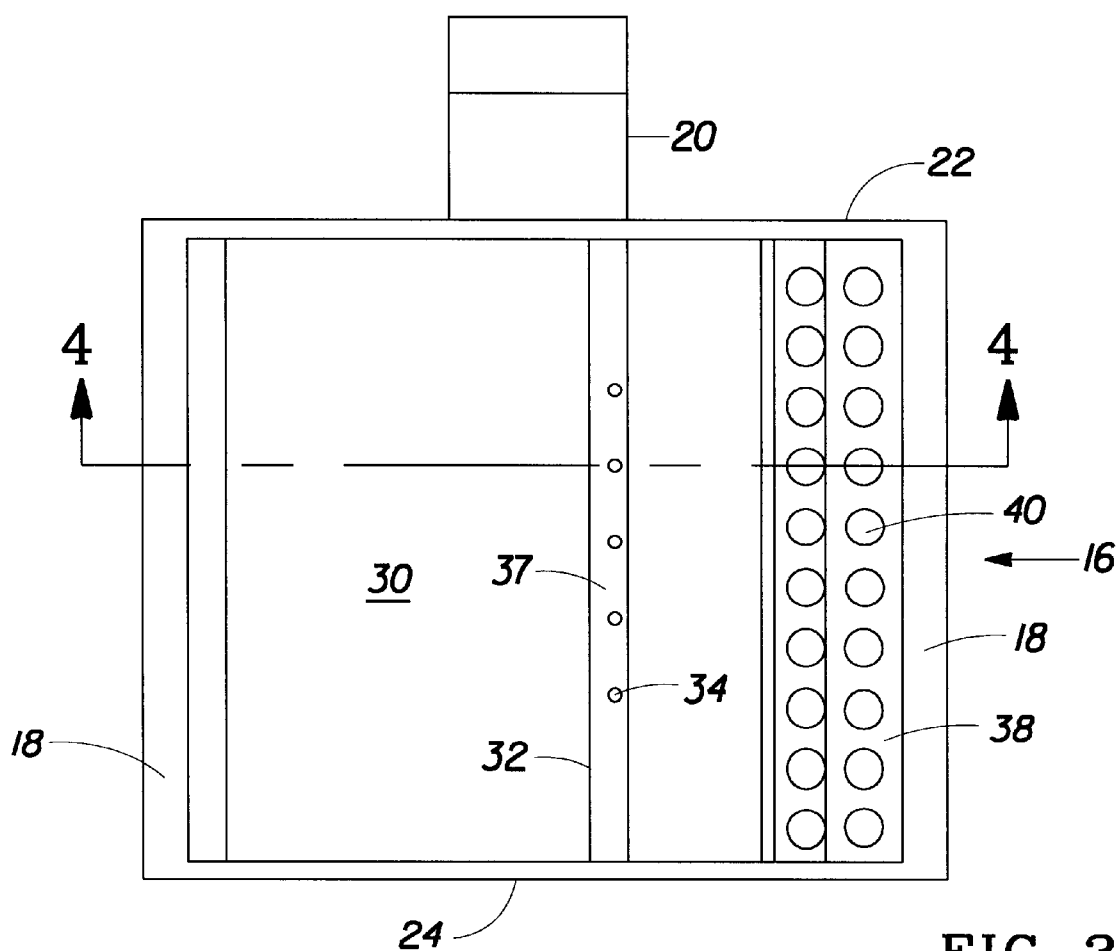
FIG. 3 is a plan view of a preferred embodiment of the brew basket of the present invention, showing a handle, a brew water reservoir, and a fluid permeable support member made of perforated metal.
Figure 4:
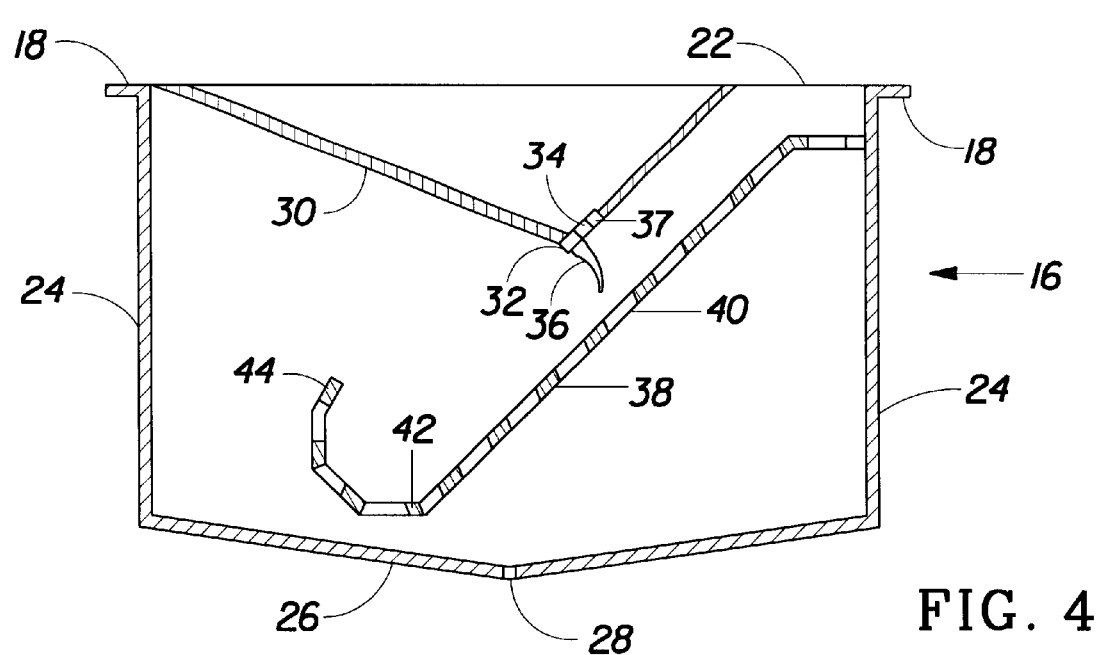
FIG. 4 is a front elevation cross-section view thereof, taken along section line 4—4 of FIG. 3, showing flexible fingers extending from the reservoir.

FIGS. 3 and 4 disclose a brew basket 16, which is designed to be used with filter pouch 10 in a brewing process, as illustrated by FIGS. 5 through 9. Brewing basket 16 is used, for example, with a commercial coffee brewing machine, such as a Bunn-O-Matic, model no. OL-35, which is made by Bunn-O-Matic Corporation of Springfield, Ill. The brewing machine, not shown, includes a refillable container of water, known as brew water or brewing fluid, which may be heated by heating elements within the machine.

The machine also includes a system for delivering heated brew water to a spray head or nozzle at a flow rate and in a time sequence determined within the machine. Brew basket 16 is preferably slidably engaged with the brewing machine directly under the spray head such that the brew basket may be removed for refilling with a fresh pouch, inserted for brewing with the fresh pouch located to receive brew water from the spray head, and then again removed for used pouch disposal. Brew basket 16 preferably has flanges 18 for engagement with the brewing machine and handle 20 for manually manipulating the brew basket with one hand. Brew basket 16 is preferably a rectangular container with substantially open top 22 and closed sides 24 and gently sloped bottom 26. Bottom 26 preferably has an orifice 28 located at the center of the sloped bottom near the lowest portion of brew basket 16. Orifice 28 is intended to discharge bypass brew water and fluid extract from the brewing process to a container, not shown, which is placed directly below brew basket 16 in the brewing machine. A brewed fluid mixture discharged to the container is available for consumption after the brewing process is completed.

Brew basket 16 is preferably made of a heat-resistant plastic by a commonly known injection molding process. It may also be fabricated of metal, such as aluminum sheet metal. Brew basket 16 has an open brew water reservoir 30 located at top 22 and facing upward to receive brew water from a spray head. A principle purpose of reservoir 30 is to receive brew water no matter what kind of spray head is in the brewing machine and to redirect the brew water at a desired flow rate to a filter pouch. Reservoir 30 has at a bottom end 32 a plurality of drain holes 34, which are located adjacent to a plurality of flexible fingers 36. One flexible finger 36 is positioned relative to one drain hole 34 such that any brew water flowing through that drain hole will flow over that flexible finger. Reservoir 30 is preferably made integral with brew basket 16, but is otherwise made of heat-resistant plastic or metal and is connected to brew basket 16 by a means not shown, such as snap-fitting, fusion welding, or other assembly processes well known in the art of rigid parts fabrication. Flexible fingers 36 are preferably injection molded from silicone rubber to be flexible, hydroscopic, and capable of withstanding 200° F. temperatures. Flexible fingers 36 are preferably connected to reservoir 30 by molding a rectangular bar 37 containing all fingers, which snap fits into a groove at bottom end 32. Bar 37 could also have drain holes 34 molded into it for accurate location relative to fingers 36. Alternatively, threads of silicone rubber could extend through drain holes 34 and be mechanically fastened to the inside surface of reservoir 30.

Brew basket 16 also has a filter pouch support member 38, which is fluid permeable, but sufficiently rigid to support filter pouch 10 during a brewing process. Support member 38 is preferably angled at 45° to horizontal, but may be inclined at an angle ranging from about 30° to about 60° for reasons which are discussed hereinafter. Support member 38 is preferably made integral with brew basket 16, but is otherwise removable and made of heat-resistant plastic, metal, or metal wire. It is connected to brew basket 16 by a means not shown, such as snap-fitting, fusion welding, or other assembly processes well known in the art of rigid parts fabrication. Support member 38 may also be made of a perforated metal having a plurality of holes 40. Support member 38 has a bottom end 42 which supports a filter pouch spaced above bottom 26.

Support member 38 is located relative to reservoir 30 such that space is provided between them to insert a filter pouch and such that flexible fingers 36 contact an outer surface of the filter pouch near an upper end thereof. Bottom end 42 has a hook-shaped portion 44 so that when a filter pouch is placed onto support member 38 and is wetted during the brewing process, the filter pouch will not slump further down the inclined support surface.

Figure 6:
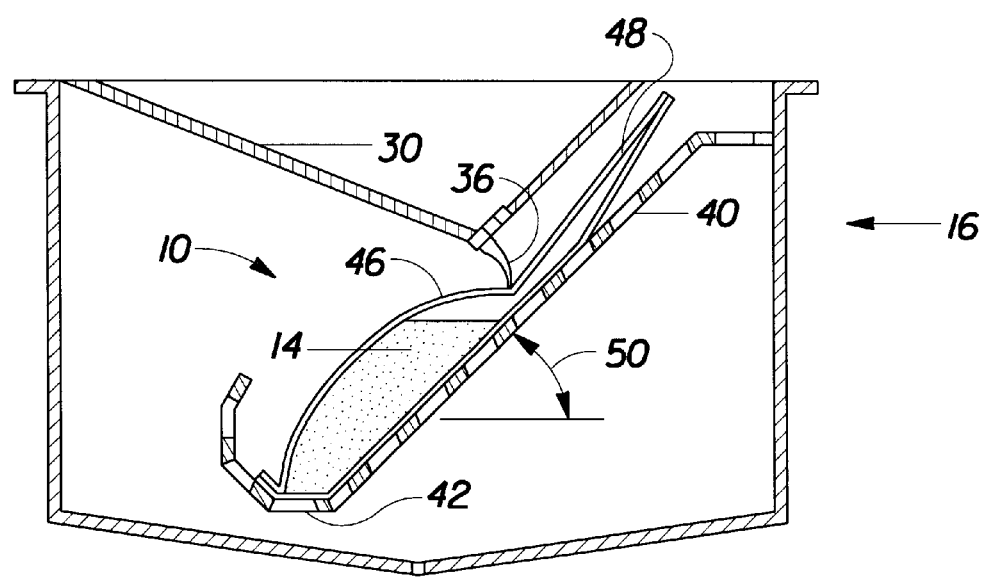
FIG. 6 is a front elevation cross-section view similar to FIG. 4, showing the preferred filter pouch of the present invention fully inserted into the brew basket of the present invention, with the flexible fingers in contact with an outer surface of the filter pouch near the upper end of the filter pouch.

FIGS. 5 through 9 show steps of a brewing process using filter pouch 10 and brew basket 16. FIG. 5 shows filter pouch 10 being placed into brew basket 16 between support member 38 and reservoir 30. Flexible fingers 36 are deflected in order for filter pouch 10 to pass under them. FIG. 6 shows filter pouch 10 located in position for brewing to commence. Flexible fingers 36 remain deflected and in contact with an outer surface 46 of filter pouch 10 near an upper portion 48 thereof. The benefit offered by flexible finger contact with the outer surface of the pouch is believed to be a reduction in surface tension at the contact point so that brew water may enter the pouch with minimal resistance and thereby avoid external brew water runoff at the outer surface. Flexible fingers 36 preferably contact filter pouch 10 at a point above the level of particles 14 so that brew water may be directed into filter pouch 10 without interference from particles 14. However, flexible finger contact is desired near to the upper level of particles 14 so that brew water does not bypass particles 14 by passing through an opposite side of filter pouch 14. The ideal location of flexible fingers 36 is therefore a function of the angle of inclination 50 of filter pouch 10. The steeper the angle, the higher fingers 36 may contact outer surface 46 without internal brew water bypass occurring.

The flexible fingers represent one embodiment of a brew water conduit in fluid communication with and extending from a brew water reservoir. Such a conduit could be a hollow tube through which brew water could flow. It could also be a solid strip of material over which brew water could flow. The flexible fingers are preferred because they provide the greatest compliance to inserting and removing a filter pouch while ensuring contact with the outer surface of the filter pouch.

Figure 7:
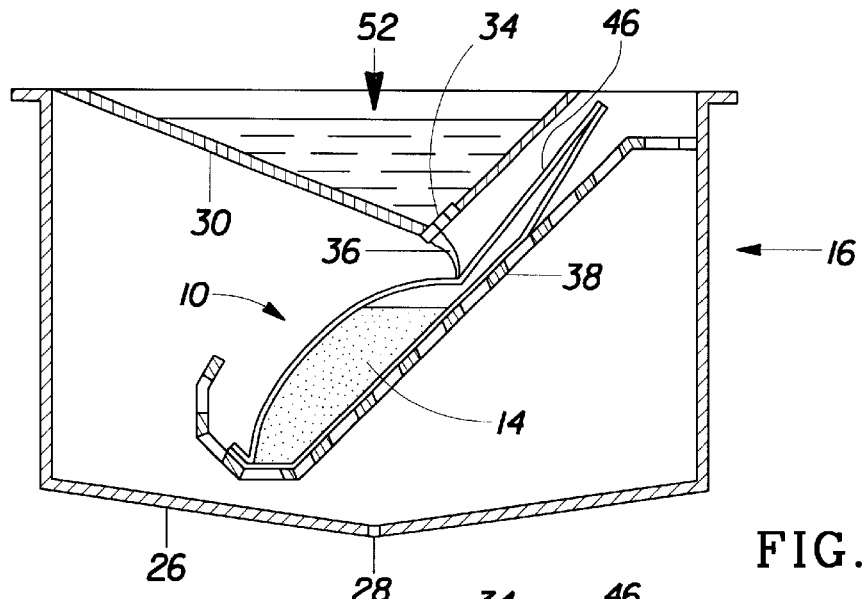
FIG. 7 is a front elevation cross-section view similar to FIG. 4, showing the preferred filter pouch of the present invention being initially filled with brew water from the reservoir via the drain holes and flexible fingers.

FIG. 7 shows a brew water 52 from a brewing machine spray head accumulating in reservoir 30. Flow of brew water 52 through drain holes 34 over flexible fingers 36 and into filter pouch 10 and particles 14 cannot be seen in FIG. 7. Brew water infiltrates particles 14 to brew a fluid extract 54 from the particles. Fluid extract 54 consists of brew water and solids dissolved from particles 14.

Figure 8:
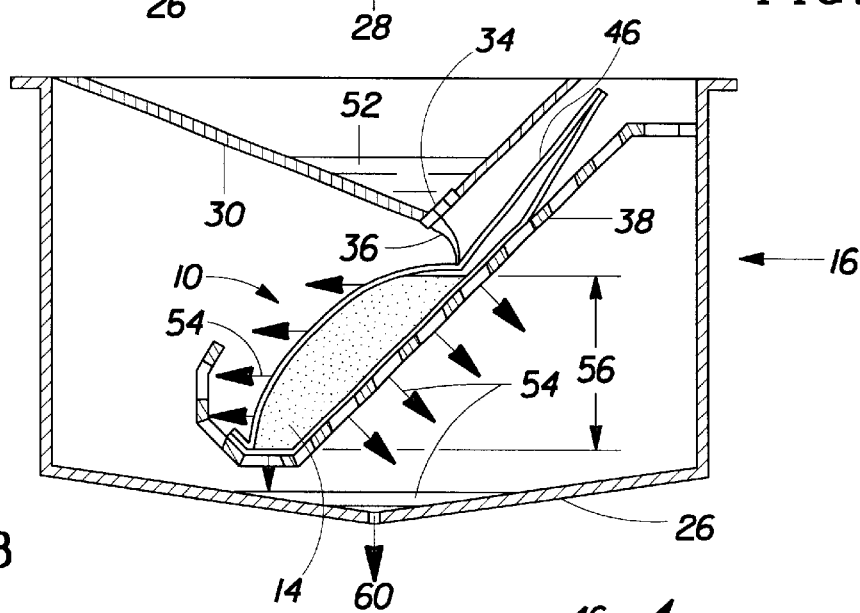
FIG. 8 is a front elevation cross-section view similar to FIG. 4, showing the preferred filter pouch of the present invention discharging fluid extract while particles have expanded and risen in the filter pouch.

FIG. 8 shows a condition of filter pouch 10 and brew basket 16 near the end of brewing, wherein the level of fluidized and expanded particles has risen within filter pouch 10 and brew water establishes a head near the point where flexible fingers 36 contact outer surface 46. In the prior art there are elaborate schemes for horizontally placed filter pouches to expand vertically in order to provide space for particle expansion and fluidization and suspension of particles.

Because the filter pouch of the present invention is inclined and only partially filled with particles, it is not necessary for opposing sides of filter pouch 10 to separate in order to generate internal space. Instead, expansion occurs inside filter pouch 10 along its axis of incline. If filter pouch 10 is inclined at an angle less than 30° from horizontal, there is likely more tendency for the opposing sides of the pouch to try to separate than for particles to move along an axis of incline. Also, at lower angles of inclination, particle positioning at a bottom end of the filter pouch is not as consistent, and brew water may not fall onto particles. It may instead pass through the opposite side of the pouch and therefore bypass the particles. If filter pouch 10 is inclined more than about 60° from horizontal, the depth of brew basket 16 would be excessive. Many brewing machines have a fixed space between spray head and top of receiving container for the brew basket to be positioned. A shorter, fatter filter pouch may permit angles of incline greater than 60° to horizontal inside brew basket 16.

Meanwhile, fluid extract 54 from particles 14 is shown continuously exiting filter pouch 10 everywhere around filter pouch 10 where particles 14 contact filter pouch 10. Because fluid extract 54 is higher in viscosity than brew water 52, and because particles 14 tend to fill pores in filter pouch 10, it is desirable that the surface area available for fluid extract 54 to exit filter pouch 10 be significantly larger than the surface area available for brew water 52 to enter filter pouch 10, so that a substantial match in flow rates maintains a fluid head 56 within filter pouch 10. Fluid head 56 is preferably developed at least as great as the depth of particles 14 in filter pouch 10 during most of the brewing time so that a maximum number of particles may be infiltrated, fluidized, and suspended by brew water 52. FIG. 8 also shows a pooling of fluid extract within brew basket 16 at sloped bottom 26 behind orifice 28. Orifice 28 is preferably sized large enough that it does not permit pooling of fluid extract 54 to a level where it touches filter pouch 10 so that the rate of discharge of fluid extract 54 from filter pouch 10 is undisturbed. Orifice 28 preferably centers a discharge stream 60 from brew basket 16 into a container waiting below brew basket 16. Multiple orifices may also be beneficial at bottom 26.

Figure 9:
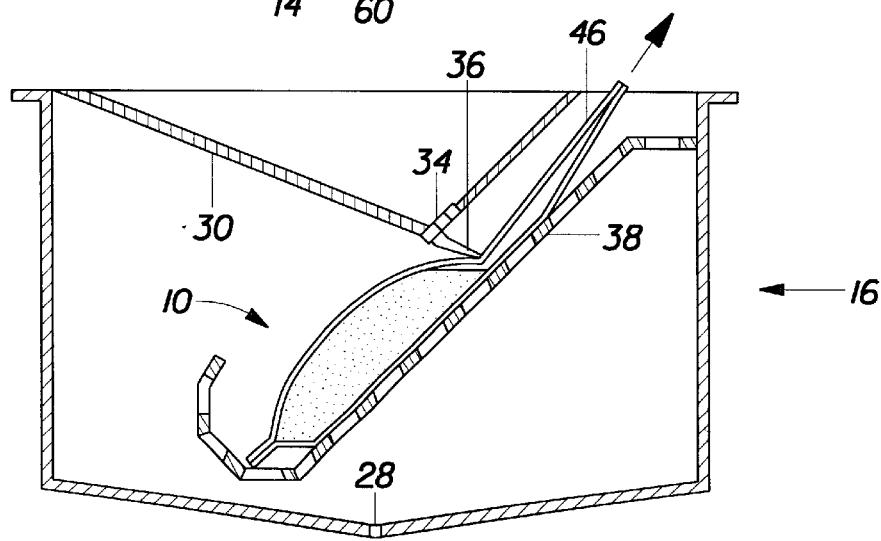
FIG. 9 is a front elevation cross-section view similar to FIG. 4, showing the preferred filter pouch of the present invention after brewing has ceased with the filter being removed from the brew basket for disposal.

FIG. 9 shows the removal of used filter pouch 10 after brewing is completed. Again, flexible fingers 36 are deflected so that the pouch may pass out of brew basket 16 the same way it entered. Alternatively, if reservoir 30 is removable from brew basket 16, reservoir 30 may first be removed and then wet filter pouch 10 may be removed more easily.

In an alternative embodiment to the use of a brew basket 16, a filter pouch may be suspended vertically or inclined at an angle of at least 30° against a support bar, and brew water may be sprayed substantially perpendicular to an upper end of a filter pouch so that brew water enters the filter pouch without the need for flexible finger contact. In such an embodiment (not shown) brew water fluidizes particles in the filter pouch just as in the brew basket embodiment. However, fluid extract exiting the filter pouch falls directly from the filter pouch into an open container below. Thus, the brew basket of the present invention is unnecessary in this embodiment. However, means for suspending or otherwise supporting the filter pouch is necessary along with directed spray nozzles in the brewing machine.

Filter pouch 10 is a fully compliant pouch, constructed only of flexible filter material in order to minimize its manufacturing cost. There are other fully compliant pouches in the prior art which are intended to be laid flat in a brew basket with compliance intended to seal the pouch against the brew basket in order to minimize brew water bypass. However, because the particle location in a horizontally disposed pouch is unpredictable, such pouches are known to provide unreliable sealing. To overcome this problem, some prior art cartridges have included rigid rim portions which provide for more predictable sealing in a brew basket. However, such a compromise significantly increases the manufacturing cost of these cartridges.

The filter pouch of the present invention contrasts with the prior art because a brew basket and pouch seal is not required. In fact, in the alternative embodiment, a brew basket is not even needed. This is because the brewing system of the present invention directs the brew water into the inclined filter pouch so that an external fluid head of brew water is not produced. The fluid head of the present invention is located inside the pouch rather than above it in a brew basket. The benefits of the present invention are that pouch cost is minimized and brew water bypass is also minimized.

In other prior art filter pouches, brew water is directed into them by making openings in the pouches. Such openings reduce the potential for brew water bypass by eliminating any filter material resistance. However, any opening compromises the integrity of the filter pouch. That is, in handling the pouch after brewing, grounds may escape through the opening. Since one of the principle advantages of a pouch is to reduce particle contamination common with open filters, providing an opening for any reason is a severe negative. The pouch of the present invention is always maintained fully closed to prevent particles escaping. Brew water is directed into filter pouch 10 without the need for an opening therein.

In a preferred embodiment, filter pouch 10 preferably has dimensions of 12 cm by 12 cm, with an internal volume of approximately 300 ml. Brew basket 16 preferably has outer dimensions of 16 cm wide by 16 cm long by 10 cm high. Support member 38 is preferably spaced away from reservoir 30 by a distance of 2.5 cm to allow access for filter pouch 10. Reservoir 30 preferably has a volume of about 150 ml . Drain holes 34 are preferably about 3 mm in diameter. and there are preferably five of them centered about 4 cm from each edge of brew basket 16. Flexible fingers 36 are preferably about 1.5 mm in diameter and about 3 cm long. Each finger preferably extends through a drain hole.

While much of the foregoing discussion has focused upon the use of a single filter pouch, it should be understood that the principles of the present invention may be applied to configurations and processes utilizing a plurality of filter pouches in side-by-side, fanshaped, or other arrangements which permit brewing in accordance with the present invention.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method of brewing a fluid extract using a filter pouch containing flavor extractable particles comprising the steps of:

a) supporting a fully compliant, fluid-permeable filter pouch, said filter pouch being partially filled with flavor extractable particles and inclined at an angle to horizontal ranging from about 30° to about 90° such that said particles accumulate at a bottom end of said filter pouch;

b) directing brew water to near an upper end of said filter pouch above said particles, said brew water entering said filter pouch, said brew water infiltrating said particles, said particles being partially fluidized by and suspended in said brew water, said particles rising with said brew water into an empty portion of said filter pouch without a need for opposing sides of said filter pouch to separate to generate internal space; and c) brewing a fluid extract from said particles in said filter pouch and discharging said fluid extract from said filter pouch, said filter pouch having sufficient exit area that a fluid extract discharge rate matches a rate of brew water entry into said filter pouch when a fluid head is produced inside said filter pouch which is at least as great as a vertical depth of particles in said filter pouch, wherein said step of directing brew water to near an upper end of said filter pouch uses a brew water conduit in contact with an outer surface of said filter pouch to reduce surface tension thereat as brew water flows over or through said conduit, such that said brew water enters said filter pouch with minimal resistance, thereby minimizing brew water running off said outer surface of said filter pouch.

2. The method of claim 1, wherein said filter pouch is supported in a brew basket by a fluid-permeable support member and said method further comprises the step of draining said fluid extract from said brew basket at a rate sufficient to prevent a pool of fluid extract contacting said bottom end of said filter pouch so that said fluid extract discharge rate remains substantially undisturbed.

3. The method of claim 1, wherein said brew water conduit comprises a plurality of flexible fingers in fluid communication with a brew water reservoir having drain holes therethrough, said flexible fingers contacting said outer surface of said filter pouch as brew water flows over said fingers from said drain holes to said outer surface.

4. A method of brewing a fluid extract using a filter pouch containing flavor extractable particles, said method comprising the steps of:

a) supporting a fully compliant, fluid-permeable filter pouch, said filter pouch being partially filled with flavor extractable particles and inclined at an angle to horizontal ranging from about 30° to about 90° such that said particles accumulate at a bottom end of said filter pouch;

b) directing brew water to near an upper end of said filter pouch above said particles using a plurality of flexible fingers in fluid communication with a brew water reservoir having drain holes therethrough, said flexible fingers contacting an outer surface of said filter pouch to reduce surface tension thereat as said brew water flows over said fingers from said drain holes and onto and into said filter pouch, minimizing brew water running off said outer surface of said filter pouch, said brew water infiltrating said particles, said particles being partially fluidized by and suspended in said brew water, said particles rising with said brew water into an empty portion of said filter pouch; and c) brewing a fluid extract from said particles in said filter pouch and discharging said fluid extract from said filter pouch, said filter pouch having sufficient exit area that a fluid extract discharge rate matches a rate of brew water entry into said filter pouch when a fluid head is produced inside said filter pouch which is at least as great as a vertical depth of particles in said filter pouch.

* * * * *